Figure 1:
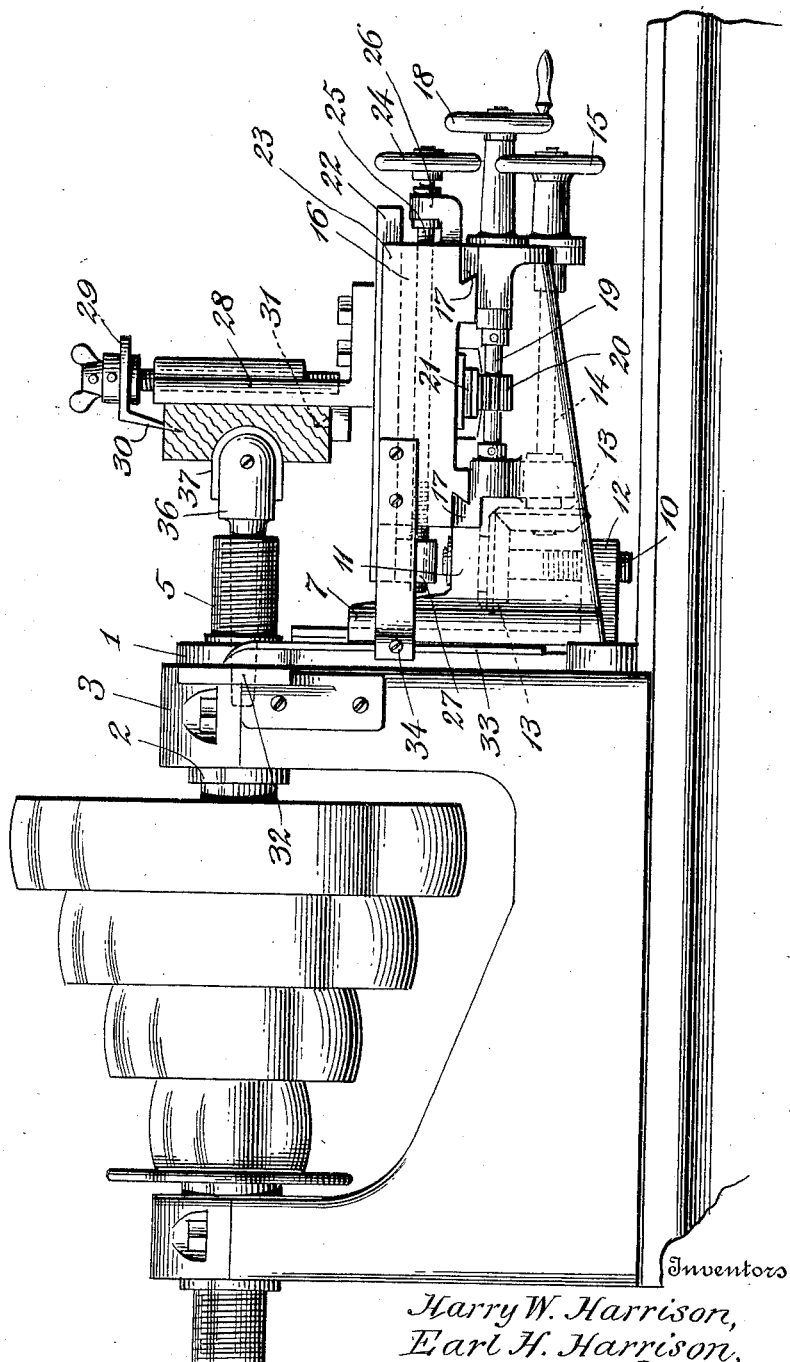

H. W. & E. H. HARRISON.
ATTACHMENT FOR LATHES.
APPLICATION FILED NOV. 27, 1911. RENEWED DEC. 19, 1912.

1,067,218.

Patented July 8, 1913.

2 SHEETS—SHEET 1.

Witnesses
F. E. Ernst
Anna C. Ravler

Inventors
Harry W. Harrison,
Earl H. Harrison,
By
Attorneys

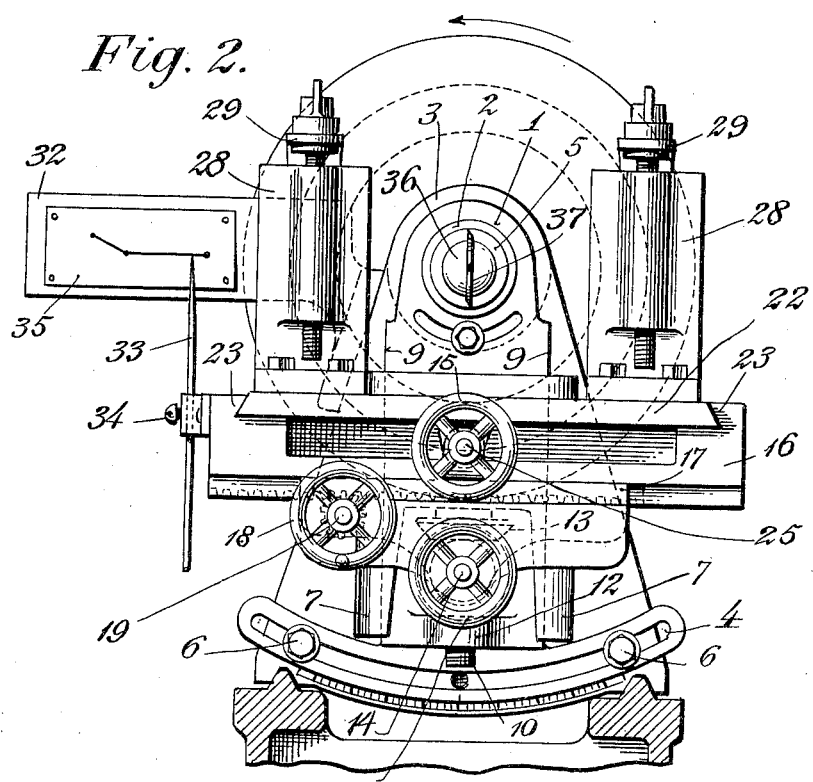
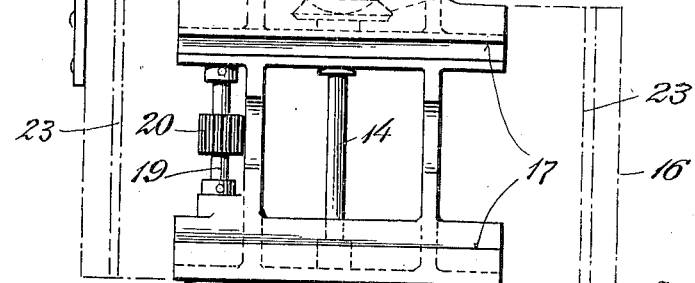

UNITED STATES PATENT OFFICE.

HARRY W. HARRISON AND EARL H. HARRISON, OF DETROIT, MICHIGAN.

ATTACHMENT FOR LATHES.

1,067,218. Specification of Letters Patent. Patented July 8, 1913.

Application filed November 27, 1911, Serial No. 662,539. Renewed December 19, 1912. Serial No. 737,764.

*To all whom it may concern:*

Be it known that we, HARRY W. HARRISON and EARL H. HARRISON, citizens of the United States of America, residing at Detroit, in the county of Wayne and State of Michigan, have invented certain new and useful Improvements in Attachments for Lathes, of which the following is a specification, reference being had therein to the accompanying drawings.

This invention relates to an attachment for wood turning lathes and more particularly to an arrangement thereof whereby a core print box or the like having any conformation may be readily and accurately routed out.

The invention consists in the matters hereinafter set forth, and more particularly pointed out in the appended claims.

In the drawings, Figure 1 is a view partly in side elevation, of a lathe head equipped with an attachment that embodies features of the invention; Fig. 2 is a view in end elevation of the attachment head; and Fig. 3 is a plan view of a portion of the device.

As herein shown in preferred construction an adjustable upright guide plate 1 has its upper end encircling the bearing boss 2 of a lathe head 3 with its lower portion provided with a segmental slot 4 whose center of curvature is the center lathe spindle 5. Cap screws 6 hold the guide plate in adjusted position. An angle plate 7 has gibs 8 in sliding engagement with vertical ways 9 on the guide plate 1 perpendicular to the spindle axis. A spindle 10 journaled parallel to the gibs in a lug 11 of the plate is in screwthreaded engagement with the boss 12 of the guide plate. A pair of meshing beveled gears 13 one of which is secured to the spindle 10 and the other of which is likewise made fast to a shaft 14 journaled in the angle plate transverse to the ways operate the spindle.

A platen 16 may be reciprocated on gibs or ways 17 of the angle plate transverse to the ways 8 of the guide plate by any suitable means, as for example, a hand wheel 18 turning a shaft 19 with a gear 20 in mesh with a rack 21 on the platen. A knee plate 22 is reciprocable parallel to the axis of the lathe spindle 5 on ways or gibs 23 of the platen, preferably a hand wheel 24 turning a shaft 25 journaled in a bracket 26 of the platen with a screwthreaded end engaging a lug 27 of the knee plate is used to shift the knee plate as desired. Knees 28 on the plate are provided with clamping members 29 of any preferred type for holding work against the faces of the knees adjacent the lathe spindle as by claws 30 forcing the work against spurs 31.

An index plate 32 is secured on the side of the lathe head in any preferred manner and a tracing rod 33 adjustably secured by a suitable clamping screw 34 on the platen 16, has an inturned point adapted to traverse a card, such as indicated at 35 on the plate 32.

In operation a cutter 36 is inserted in the lathe spindle 35 with a dressed blade 37 adapted to cut a groove semi-circular in cross section of any desired diameter in the work clamped against the faces of the knees 28. If it is desired to merely rout out a straight core the work is adjusted and advanced against the cutter and then by manipulation of the wheel 18, the work is forced transversely past the lathe spindle. If the core to be produced by the box is not straight a card having a guiding line corresponding to the axis of the core recess is placed on the plate 32, the tracing rod 33 brought to register with one end of the line, and thereafter by manipulation of the several hand wheels the cutter is forced through the work as the tracer follows the axis line on the card thus obtaining the desired direction to the path of the core.

By this arrangement an attachment which may be secured to any lathe is had whereby the operator can readily manipulate the cutter to produce the desired result without watching the progress of the cutter through the work. This avoids the inconvenience of following the cutter while the chips and dust are being thrown therefrom and as the diagram card is directly in front of the operator as he stands in the most convenient position for manipulating the attachment, the results obtained are very accurate as there are no strained positions of the operator and no complicated parts of the attachment which are liable to displacement.

Obviously, changes in the details of construction may be made without departing from the spirit of the invention and we do not care to limit ourselves to any particular form or arrangement of parts.

What we claim is:—

1. The combination with a lathe head and the spindle thereof having a tool holding outer end, of a guide plate adjustably secured on the lathe head adjacent the outer end of the spindle, an angle plate reciprocable on the guide plate transversely to the spindle axis, a platen reciprocable on the angle plate transversely to the path of motion of the guide plate, a knee plate reciprocable on the platen parallel to the spindle axis, work clamping members on the knee plate and manually operable means for reciprocating said members.

2. The combination with a lathe head and the spindle thereof having a tool holding outer end, of a guide plate adjustably secured on the lathe head adjacent the outer end of the spindle, an angle plate reciprocable on the guide plate transversely to the spindle axis, a platen reciprocable on the angle plate transversely to the path of motion of the guide plate, a knee plate reciprocable on the platen parallel to the spindle axis, work clamping members on the knee plate, manually operable means for reciprocating said members, an index plate on the lathe head, and a tracing member on the platen traversing the index plate.

3. The combination with a lathe head and the spindle thereof adapted to hold a tool in its outer end, of a guide plate angularly adjustable on the lathe head on a center of motion co-incident with the spindle axis, an angle plate reciprocable on the guide plate in a plane passing through its center of motion, a platen reciprocable on the angle plate in a plane parallel to the spindle axis and transverse to the path of motion of the angle plate, a knee plate reciprocable on the angle plate in a plane parallel to the spindle axis, work clamping means on the angle plate, and manually operable means for severally reciprocating the angle plate, the platen and the knee plate.

4. The combination with a lathe head and the spindle thereof adapted to hold a tool in its outer end, of a guide plate angularly adjustable on the lathe head on a center of motion co-incident with the spindle axis, an angle plate reciprocable on the guide plate in a plane passing through its center of motion, a platen reciprocable on the angle plate in a plane parallel to the spindle axis and transverse to the path of motion of the angle plate, a knee plate reciprocable on the angle plate in a plane parallel to the spindle axis, work clamping means on the angle plate, manually operable means for severally reciprocating the angle plate, the platen and the knee plate, an index plate on the lathe head in a plane perpendicular to the spindle axis, and a tracing member on the platen adapted to traverse the index plate.

5. The combination with a lathe head and the spindle thereof having a tool holding outer end, of a guide plate journaled near one end on the lathe head concentric with the spindle, means for clamping the plate in adjusted position on the head, an angle plate reciprocable on the guide plate to and from the center of motion of the guide plate, a platen reciprocable on the angle plate in a plane at right angles to the path of motion of the angle plate, a knee plate reciprocable on the angle plate in a plane parallel to the axis of the lathe spindle, manually operable means for severally reciprocating the parts, and means for indicating the path of motion of the knee plate.

6. The combination with a lathe head and the spindle thereof having a tool holding outer end, of a guide plate pivoted near one end on the lathe head concentrically with the spindle, means for clamping the plate in adjusted position on the head, ways on the guide plate perpendicular to the axis of the spindle, an angle plate reciprocable on said ways, manually operable means for reciprocating the angle plate, ways on the angle plate transverse to the ways of the guide plate, a platen reciprocable on the ways, manually operable means for reciprocating the platen, ways on the platen parallel to the axis of the spindle, a knee plate reciprocable on the platen ways, manually operable means for reciprocating the knee plate, work clamping members on the knee plate, an index plate on the lathe head in a plane perpendicular to the spindle, and an indicating member on the platform adapted to traverse the index plate.

7. The combination with a lathe head and the spindle thereof having a tool holding outer end, of a guide plate angularly adjustable on the lathe head with its center of motion co-incident with the axis spindle, ways on the guide plate perpendicular to the axis spindle, an angle plate reciprocable in the ways, a spindle journaled in the plate parallel to the ways in screwthreaded engagement with the guide plate, a manually operable shaft journaled in the angle plate, gears operatively connecting the shaft and spindle, ways on the angle plate in a plane perpendicular to the guide plate ways, a platen reciprocable thereon, a rack on the platen, a manually rotatable shaft journaled on the platen, a gear on the shaft in mesh with the rack, ways on the platen parallel to the spindle axis, a shaft journaled on the platen parallel to its ways, a knee plate reciprocable on the platen ways in screwthreaded engagement with the shaft, knees on the plate, clamping means for holding work against the face of the knees adjacent the spindle tool end, an index plate on the lathe head in a plane parallel to the ways of the guide plate and of the platen, and a tracing member adjustably secured on the platen and adapted to traverse the index plate.

In testimony whereof we affix our signatures in presence of two witnesses.

HARRY W. HARRISON.
EARL H. HARRISON.

Witnesses:
C. R. STICKNEY,
A. M. SHANNON.

Copies of this patent may be obtained for five cents each, by addressing the "Commissioner of Patents, Washington, D. C."